United States Patent
Lee et al.

(10) Patent No.: US 9,204,542 B1
(45) Date of Patent: Dec. 1, 2015

(54) MULTI-USE PACKAGE SUBSTRATE

(71) Applicant: Xilinx, Inc., San Jose, CA (US)

(72) Inventors: Tien-Yu Lee, San Jose, CA (US); Rafael C. Camarota, San Jose, CA (US)

(73) Assignee: XILINX, INC., San Jose, CA (US)

( * ) Notice: Subject to any disclaimer, the term of this patent is extended or adjusted under 35 U.S.C. 154(b) by 186 days.

(21) Appl. No.: 13/735,338

(22) Filed: Jan. 7, 2013

(51) Int. Cl.
  *H05K 1/11* (2006.01)
  *G06F 17/50* (2006.01)

(52) U.S. Cl.
  CPC ............ *H05K 1/111* (2013.01); *G06F 17/5081* (2013.01)

(58) Field of Classification Search
  CPC .................................................. H05K 1/11
  See application file for complete search history.

(56) References Cited

U.S. PATENT DOCUMENTS

| | | | | |
|---|---|---|---|---|
| 5,898,217 A * | 4/1999 | Johnston | | 257/691 |
| 5,936,415 A | 8/1999 | Fredrickson | | |
| 5,945,837 A | 8/1999 | Fredrickson | | |
| 5,952,839 A | 9/1999 | Fredrickson | | |
| 6,366,467 B1 * | 4/2002 | Patel et al. | | 361/760 |
| 6,879,494 B2 * | 4/2005 | Zu et al. | | 361/768 |
| 7,285,973 B1 | 10/2007 | Mardi et al. | | |
| 7,498,192 B1 | 3/2009 | Goetting et al. | | |
| 7,535,239 B1 | 5/2009 | Dang et al. | | |
| 7,847,404 B1 * | 12/2010 | Schwegler et al. | | 257/758 |
| 7,888,954 B1 | 2/2011 | Mardi | | |
| 2003/0198031 A1 * | 10/2003 | Peterson | | 361/760 |
| 2004/0027819 A1 | 2/2004 | Berberich | | 361/818 |
| 2005/0017345 A1 * | 1/2005 | Sathe | | 257/700 |
| 2005/0133930 A1 * | 6/2005 | Savastisuk et al. | | 257/774 |
| 2009/0085217 A1 * | 4/2009 | Knickerbocker et al. | | 257/774 |
| 2009/0113698 A1 * | 5/2009 | Love et al. | | 29/739 |
| 2010/0133534 A1 * | 6/2010 | Do et al. | | 257/48 |
| 2011/0186990 A1 * | 8/2011 | Mawatari et al. | | 257/737 |
| 2012/0025368 A1 * | 2/2012 | Lin et al. | | 257/737 |
| 2013/0076387 A1 * | 3/2013 | Ishikawa et al. | | 324/762.03 |
| 2013/0087920 A1 * | 4/2013 | Jeng et al. | | 257/773 |
| 2013/0242493 A1 * | 9/2013 | Shenoy et al. | | 361/679.21 |
| 2013/0320565 A1 * | 12/2013 | Griswold | | 257/777 |
| 2014/0048928 A1 * | 2/2014 | Li et al. | | 257/737 |
| 2014/0073087 A1 * | 3/2014 | Huang et al. | | 438/107 |
| 2014/0175666 A1 * | 6/2014 | Rahman et al. | | 257/774 |

* cited by examiner

*Primary Examiner* — Steven T Sawyer
(74) *Attorney, Agent, or Firm* — Gerald Chan; Keith Taboada

(57) ABSTRACT

An apparatus includes a package substrate for a first SSIT product with a first top die configuration, wherein the package substrate is compatible with a second SSIT product with a second top die configuration, and wherein the first top die configuration is different from the second top die configuration.

20 Claims, 4 Drawing Sheets

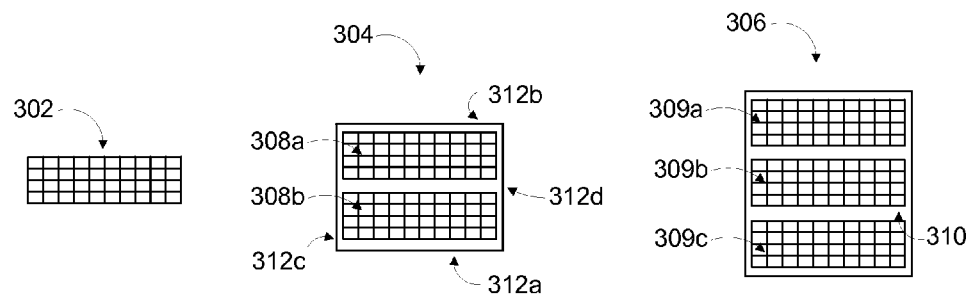
FIG. 3-1
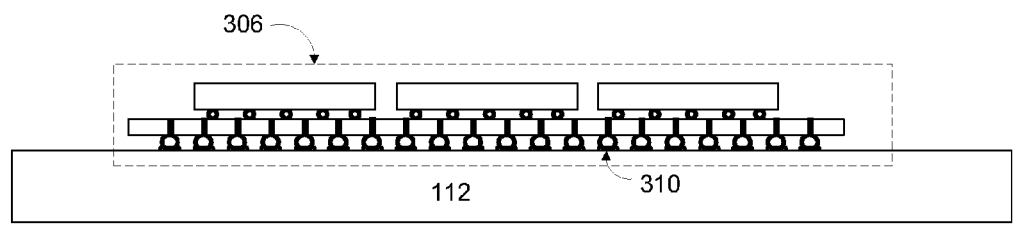
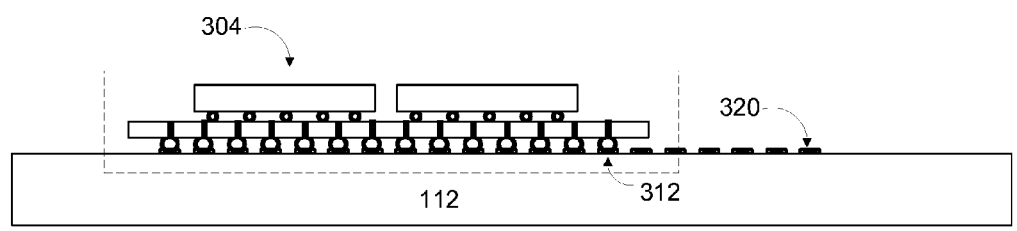
FIG. 3-2

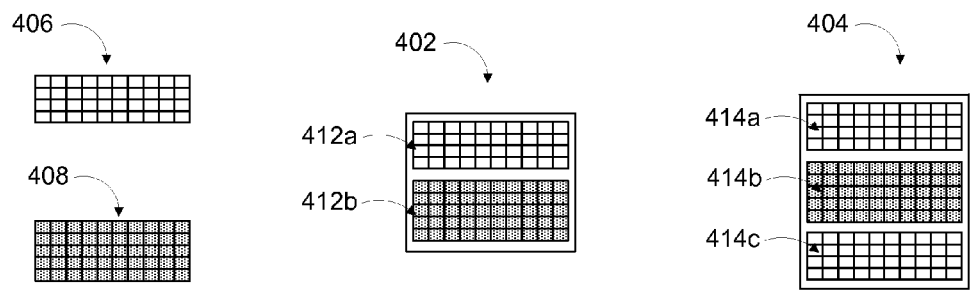
FIG. 4-1
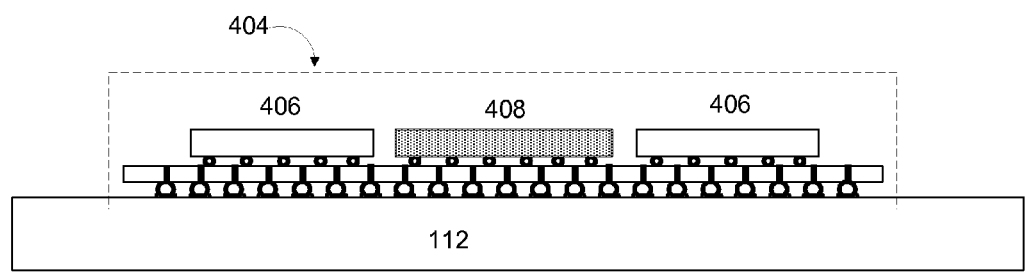
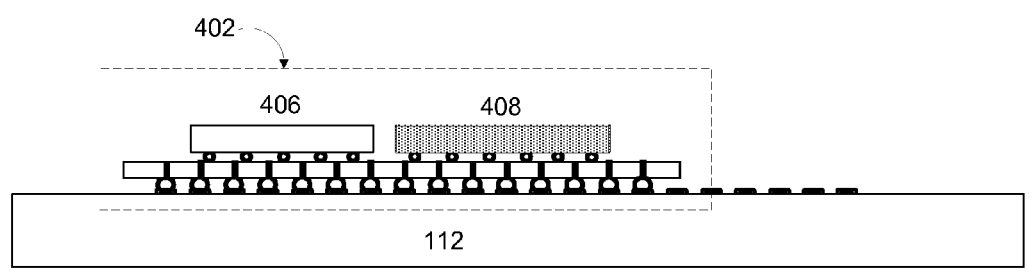
FIG. 4-2

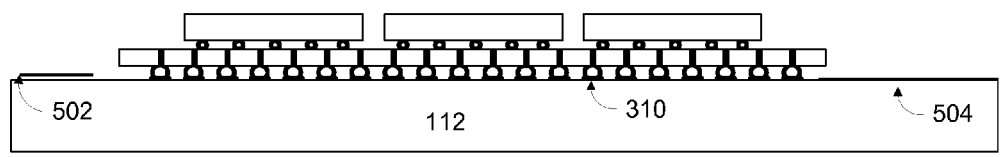
FIG. 5-1
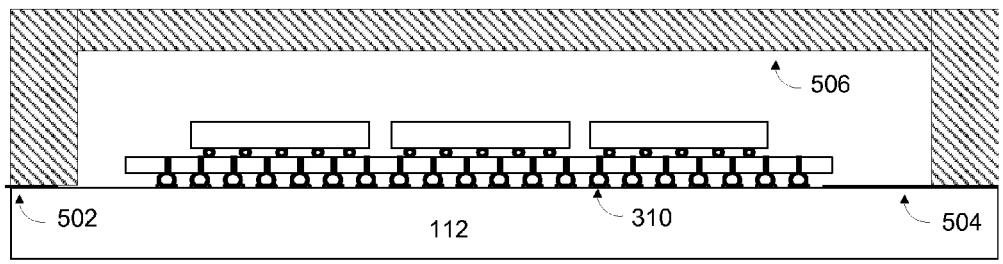
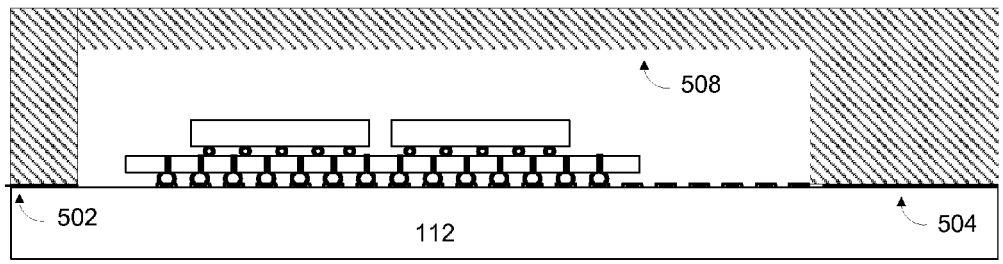
FIG. 5-2

MULTI-USE PACKAGE SUBSTRATE

TECHNICAL FIELD

This application relates to a package substrate that is compatible with multiple Stacked Silicon Interconnect Technology (SSIT) products.

BACKGROUND

Stacked Silicon Interconnect Technology (SSIT) allows for multiple field-programmable gate arrays (FPGAs) to be combined in a single package. This potentially allows for higher bandwidth, capacity, and power reduction compared to a monolithic implementation. However, current SSIT techniques require that each unique SSIT product must use a different package substrate type. This is true even if the unique SSIT products have similar device patterns and package footprints. No single package substrate type is shared between multiple devices. If multiple unique SSIT products could be made to utilize the same package substrate type, it would minimize design efforts while reducing packaging costs and time to market.

SUMMARY

An apparatus includes a package substrate for a first SSIT product with a first top die configuration, wherein the package substrate is compatible with a second SSIT product with a second top die configuration, and wherein the first top die configuration is different from the second top die configuration.

Optionally, the first top die configuration of the first SSIT product may be compatible with the second top die configuration of the second SSIT product.

Optionally, the first top die configuration of the first SSIT products may match a subset of the second top die configuration of the second SSIT product.

Optionally, the apparatus may also include the first SSIT product with an interposer pattern that is compatible with an interposer pattern of the second SSIT product.

Optionally, the first top die of the first SSIT product may have a ubump configuration that is a same as that of the second top die of the second SSIT product.

Optionally, the interposer pattern of the first SSIT product may have a same C4 bump configuration as that of the interposer pattern of the second SSIT product.

Optionally, the interposer pattern of the first SSIT product may have a same C4 bump configuration as that of the interposer pattern of the second SSIT product.

Optionally, the apparatus may include the first SSIT product, wherein the first SSIT product is different from the second SSIT product in size, or has a C4 bump pattern that is different from that of the second SSIT product.

Optionally, the first SSIT product may be smaller in size than the second SSIT product, and the first SSIT product may have bumps along a side of the first SSIT product that are a same type as that of bumps at corresponding locations on the second SSIT product, the corresponding locations being away from a side of the second SSIT product.

Optionally, the bumps along the side of the first SSIT product may include power bumps or ground bumps.

Optionally, the first SSIT product may be larger in size than the second SSIT product, and the first SSIT product may include dummy bumps along four sides of the first SSIT product.

Optionally, the first and second SSIT products may use common package footprints.

Optionally, the first and second SSIT products may have a same type of ball grid array (BGA).

Optionally, the first and second SSIT products may have compatible I/O and GT channel layouts.

Optionally, the package substrate may include a package lid contact zone that allows for multiple package lid edge widths.

A method of determining whether a package substrate is compatible with both a first SSIT product having a first top die configuration and a second SSIT product having a second top die configuration, wherein the first top die configuration is different from the second top die configuration, includes: determining whether the first top die configuration is compatible with the second top die configuration; determining whether an interposer pattern of the first SSIT product is compatible with an interposer pattern of the second SSIT product; and determining if a package footprint of the first SSIT product is compatible with a package footprint of the second SSIT product. One or more of the acts of determining are performed using a processing unit.

Optionally, the first top die configuration may be determined as compatible with the second top die configuration if one of the first and second top die configurations matches a subset of other one of the first and second top die configurations.

Optionally, the interposer patterns of the respective first and second SSIT products may be determined as compatible if the interposer patterns of the respective first and second SSIT products have a same C4 bump configuration.

Optionally, the first SSIT product may be smaller than the second SSIT product, and the interposer patterns of the respective first and second SSIT products may be compatible if bumps along a side of the first SSIT product is a same type as that of bumps at corresponding locations on the second SSIT product, the corresponding locations being away from a side of the second SSIT product.

Optionally, the package footprints of the respective first and second SSIT products may be determined as compatible if the first and second SSIT products have a same type of BGA.

Other and further aspects and features will be evident from reading the following detailed description of the various examples described herein.

BRIEF DESCRIPTION OF THE DRAWINGS

The drawings illustrate the design and utility of exemplary structures and methods in which similar elements are referred to by common reference numerals. These drawings are not necessarily drawn to scale. In order to better appreciate how the above-recited and other advantages and objects are obtained, a more particular description is rendered of the examples that are illustrated in the accompanying drawings. These drawings depict only exemplary structures and methods, and are not therefore to be considered limiting of the scope of the claims.

FIG. 3-1 shows an exemplary apparatus where the different SSIT products use a same type of top die;

FIG. 3-2 shows a side view of the apparatus of FIG. 3-1 where the different SSIT products use a same type of top die;

FIG. 4-1 shows an exemplary apparatus where different SSIT products use multiple types of top die;

FIG. 4-2 shows a side view of the apparatus of FIG. 4-1 where the different SSIT products use multiple types of top die;

FIG. 5-1 shows an exemplary apparatus where the package substrate comprises a larger sized package lid contact zone; and FIG. 5-2 shows the apparatus of FIG. 5-1 where the larger sized package lid contact zone is selectively used for multiple package lids with different edge widths.

DETAILED DESCRIPTION

Figure 1:
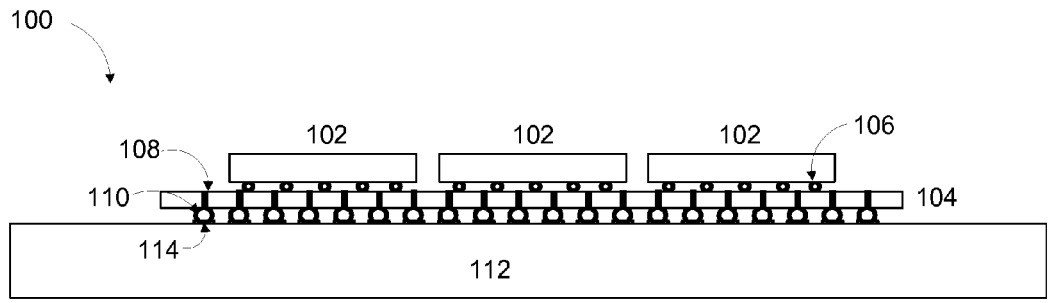
FIG. 1 shows a side view of an exemplary SSIT product.

Various apparatus and methods are described hereinafter with reference to the figures. It should be noted that the figures are not drawn to scale, and that the elements of similar structures or functions are represented by like reference numerals throughout the figures. It should be noted that the figures are only intended to facilitate the description of the examples. They are not intended as an exhaustive description of the invention or as a limitation on the scope of the claimed invention. In addition, an illustrated example need not have all the aspects or advantages shown. An aspect or an advantage described in conjunction with a particular example is not necessarily limited to that example, and can be practiced in any other examples, even if not so illustrated, or if not explicitly described. Also, reference throughout this specification to "some embodiments" or "other embodiments" means that a particular feature, structure, material, or characteristic described in connection with the examples may be included in at least one embodiment of the invention. Thus, the appearances of the phrase "in some embodiments" or "in other embodiments" in various places throughout this specification are not necessarily referring to the same embodiment or embodiments.

Stacked Silicon Interconnect Technology (SSIT) is a technology that allows for multiple components, such as field-programmable gate arrays (FPGAs), to be combined in a single package. SSIT offers a number of advantages, potentially allowing for much higher bandwidth, capacity, and power reduction compared to monolithic implementations that use a single FPGA per package.

FIG. 1 illustrates a side view of an exemplary SSIT product 100. The SSIT product 100 has multiple FPGA slices referred to herein as top dies 102. The top dies 102 can be any type of FPGA slice such as, for example, 28 nm FPGA slices or 20 nm FPGA slices.

To connect the top dies 102 to other components, The SSIT product 100 includes a silicon interposer 104, located between the top dies 102 and a package substrate 112. The interposer 104 may be a passive device, containing no active transistors, and is connected to the top dies 102 through microbumps (μbumps) 106 and to the package substrate 112 through C4 bumps 110. The pattern of the μbumps 106 and the C4 bumps 110 together define the interposer pattern of the SSIT product 100. To connect the top dies 102 to power, ground, and I/O signals, the interposer 104 contains through silicon vias (TSVs) 108 which bridge power, ground, and I/O signals between the top dies 102 and the C4 bumps 110.

The package substrate 112 may be either an organic or ceramic substrate, and may include pads 114 where the C4 bumps 110 connect. The size of the substrate 112, the number of ball grid array (BGA) balls, and/or number of I/O and GT channels may define the package footprint of the product 100.

In some cases, a SSIT technique may require that each unique SSIT product use a unique package substrate. No single package substrate type is shared between unique SSIT products. Even in cases where multiple unique SSIT products in the same product family have similar device patterns and package footprints, unique package substrates is still designed for each product. However, if a single package substrate type could be made to be compatible with multiple unique SSIT products, it would have many advantages.

First, having one package substrate type that is compatible with multiple unique SSIT products would simplify design and reduce design efforts due to the need to design only a single package substrate types instead of multiple unique package substrate types for the unique SSIT products.

Having one package substrate type for multiple unique SSIT products may also potentially reduce package cost by concentrating the volume from two or more different package substrate types into one. This is because typically package substrate unit cost decreases with higher volume. Due to the expensive and time-consuming process of qualifying new package substrate designs, time to market (TTM) may also be reduced through the reuse of a single package substrate type instead of having to design two or more different package substrate types.

Using the same package substrate type for multiple unique SSIT products may also result in more closely matched I/O performance in similar SSIT products. This is because the length and layout of all I/O and GT tracts of a die using the same package will be by definition identical, resulting in equal trace length and typography. Channel to channel skew and device to device skew reduction may be critical for the reliable operation of ever faster memory and serial interfaces, which have little margin for pin-to-pin or device to device skew.

Using multi-use package substrates also benefits a software virtual device (SVD) strategy, which allows a bigger SSIT product to replace a smaller SSIT product in early production when time to market and development cost takes precedence over unit cost. When production volume increases and unit cost becomes more important, having a package substrate type compatible with multiple unique SSIT products allows for an easier SSIT product switch with less need for redesign later, due to the eliminated or reduced device to device skew from the identical package substrate types.

Figure 2:
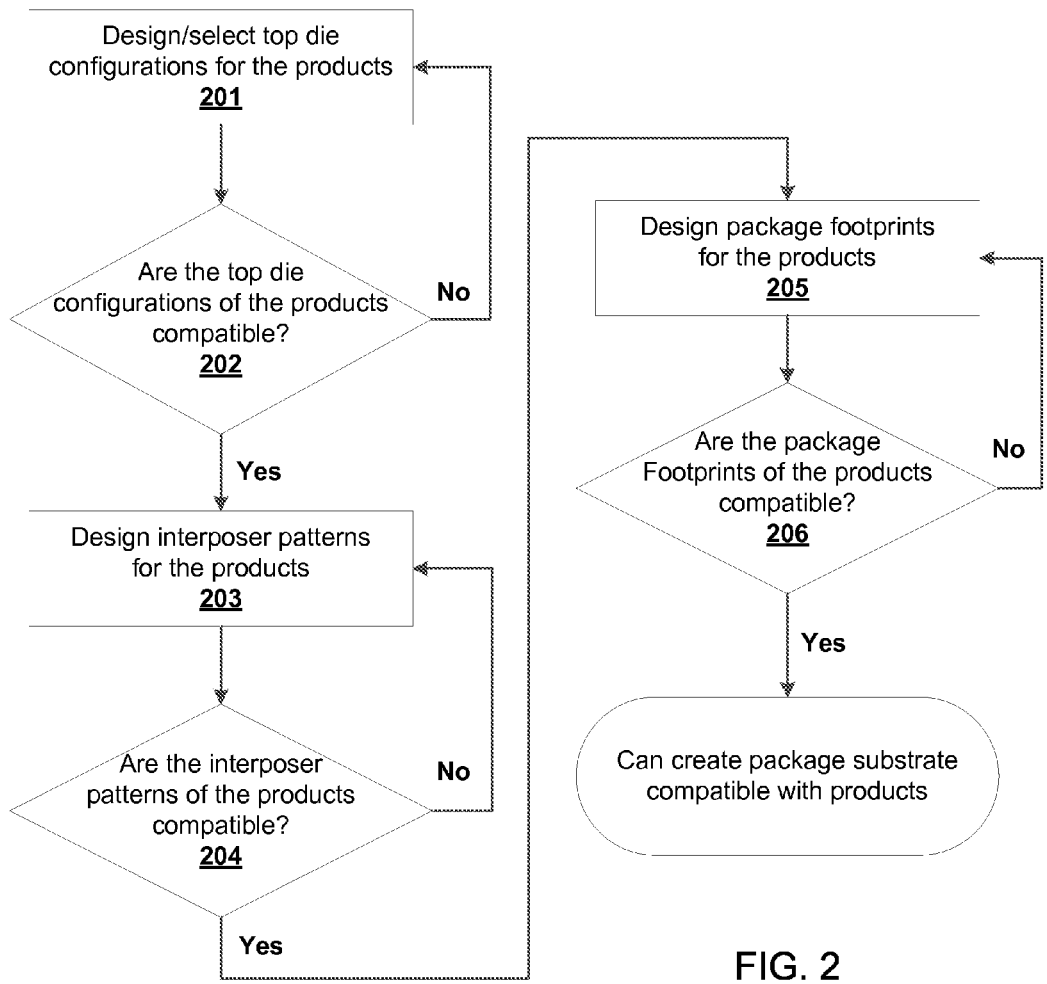
FIG. 2 illustrates a method of designing a plurality of unique SSIT products to be compatible with a single package substrate.

FIG. 2 illustrates a process of designing a plurality of unique SSIT products to be able to use the same package substrate type. First, at item 201, top die configurations are determined (e.g., designed or selected) for the two SSIT products. In some embodiments, this may involve selecting the types of top dies to be used, the number of top dies, and/or how they are arranged on each SSIT product. In some embodiments, the act of determining top die configurations may be performed using a processing unit (e.g., a design software running on a processor).

At item 202, a determination is made as to whether the two unique SSIT products have compatible top dies. In some embodiments, two unique SSIT products have compatible top dies if the top die configuration of one of the SSIT products matches a subset of the top die configuration of the other SSIT product. For example, if a first SSIT product contains three top dies and a second SSIT product contains two top dies, the two SSIT products have compatible top dies if the two top dies of the second SSIT product are the same as the first two top dies of the first SSIT product. If the products are determined to not have compatible top dies, then the process returns to item 201, where the top die configurations of the two products can be redesigned to be compatible. If the products are determined to have compatible top dies, the process moves on to item 203. In some embodiments, the act of determining whether two unique SSIT products have compatible top dies may be performed using a processing unit (e.g., a software running on a processor, which may be configured to compare design parameters associated with top dies design for the two SSIT products). In other embodiments, the act of determining whether two unique SSIT products have compatible top dies may be determined manually (e.g., by a user who manually compares design parameters associated with top dies design for the two SSIT products).

At item 203, the connection patterns for the interposer dies of the two SSIT products are designed. This may include designing the μbump configuration connecting the top dies to the interposers, and the C4 bump configuration connecting the interposers to the substrates. In some embodiments, the act of designing the interposer patterns may be performed using a processing unit (e.g., a design software running on a processor).

When the design is complete, a determination at item 204 is then made as to whether the two unique SSIT products have compatible interposer patterns. In some embodiments, if the two unique SSIT products have the same and repeatable μbump and C4 bump configurations under the top die area, then they are considered to have compatible interposer patterns. If the determination is made that the SSIT products have compatible interposer patterns, then the process proceeds to item 205. Otherwise, the process returns to item 203 where the interposer patterns of the two SSIT products can be redesigned to be compatible. In some embodiments, the act of determining whether two unique SSIT products have compatible interposer patterns may be performed using a processing unit (e.g., a software running on a processor, which may be configured to compare design parameters associated with interposer pattern design for the two SSIT products). In other embodiments, the act of determining whether two unique SSIT products have compatible interposer patterns may be determined manually (e.g., by a user who manually compares design parameters associated with interposer pattern design for the two SSIT products).

Next, at item 205, the package footprints of the two SSIT products are designed. In some embodiments, this may include determining the size of package substrate to be used, and/or designing the layout of the ball grid array (BGA) and the layout of the I/O and GT channels for each SSIT product. Also, in some embodiments, the act of designing the package footprints may be performed using a processing unit (e.g., a design software running on a processor).

Then, at item 206, a determination is then made as to whether the two unique SSIT products have compatible package footprints. In some embodiments, this is done by comparing the sizes of the package substrate associated with the unique SSIT products, the number of balls in the BGA associated with each unique SSIT product, and the number of I/O and GT channels that come from the common top dies of each unique SSIT product. If these are the same, then the unique SSIT products are found to have compatible package footprints. If the determination is made that the unique SSIT products have compatible package footprints, then the SSIT products will be found able to utilize the same package substrate. Else, the process returns to item 205 where the package footprints of the two SSIT products can be redesigned so that they can be compatible. In some embodiments, the act of determining whether two unique SSIT products have compatible package footprints may be performed using a processing unit (e.g., a software running on a processor, which may be configured to compare design parameters associated with package footprint design for the two SSIT products). In other embodiments, the act of determining whether two unique SSIT products have compatible package footprints may be determined manually (e.g., by a user who manually compares design parameters associated with package footprint design for the two SSIT products).

Thus, in order for a single package substrate type to be compatible with multiple unique SSIT products, the unique SSIT products may be designed to satisfy all three conditions, of having (i) compatible top dies, (ii) compatible interposer patterns, and (iii) compatible package footprints. If any of the top dies, interposer patterns, or package footprints are found to be incompatible (e.g., if any of the above conditions fail), then a single package substrate type will not be compatible with the different SSIT products.

It should be noted that the term "compatible", when used in this specification to describe two SSIT products (or components or configurations thereof, such as top dies, interposer patterns, package footprints, etc.), may refer to two items that are the same, of a same type, have similar or same configuration, correspond with, and/or match, with each other.

While FIG. 2 illustrates a particular order in designing two SSIT products so that the same package substrate type may be used for both SSIT products, it is important to note that the items in the design process may have other orders. For example, in other embodiments, the acts of determining top die configurations, designing interposer patterns, and designing package footprints for the different SSIT products may be in an order that is different from that described previously. Also, in other embodiments, instead of designing two SSIT products so that a same package substrate type may be used for both SSIT products, more than two SSIT products (with different respective configurations) may be designed so that a same package substrate type may be used for all SSIT products.

Also, in other embodiments, a method may be provided for determining whether a same package substrate type is applicable for the different SSIT products. Such method may involve determining whether there is top die compatibility (like that described with reference to item 202), determining whether there is interposer pattern compatibility (like that described with reference to item 204), and determining whether there is package footprint compatibility (like that described with reference to item 206).

In some embodiments, the method for determining whether a same package substrate type is applicable for different SSIT products may be part of the method of FIG. 2. In other embodiments, the method for determining whether a same package substrate type is applicable for different SSIT products may be performed for the different SSIT products that have been already designed.

FIGS. 3-1 and 3-2 illustrate an exemplary apparatus where a single type of package substrate is compatible with multiple unique SSIT products. In FIG. 3-1, top dies of type 302 are used in both first SSIT product 304 and second SSIT product 306. The SSIT product 304 contains two top die 308a, 308b of type 302, while the SSIT product 306 contains three top die 309a, 309b, 309c of type 302.

In order for the first and second SSIT products 304, 306 to be compatible with a single type of package substrate 112, they may be required to have (i) compatible top dies, (ii) compatible interposer patterns, and (iii) compatible package footprints. Here, the two top dies of the SSIT product 304 are of the same type as the first two top dies of the SSIT product 306. The first two top dies 308a, 308b of the SSIT product 306 are the same sequence as the top dies 309a, 309b of the SSIT product 304. Therefore SSIT products 304 and 306 have the same sequence of top die types and so may be determined as having compatible top dies.

The SSIT products 304 and 306 also have compatible interposer patterns because their interposers have the same and repeatable μbump and C4 bump configurations in the area under the top dies, the μbump and C4 bump patterns of the first SSIT product 304 and second SSIT product 306 being the same in the area under the common top dies. This is shown in the side view illustrated in FIG. 3-2.

The SSIT products 304 and 306 may be requested by the customer to use the same package footprint. If the package footprints are the same size, with the same number of balls in the BGA, and the number of I/O and GT channels from the common top dies is the same, then they may be determined to be compatible.

Because the top dies, interposer patterns, and package footprints are all compatible, it is possible to design a single type of package substrate 112 to be compatible with both the SSIT product 304 and the SSIT product 306. In other words, the package substrate 112 for the SSIT product 304 and the package substrate 112 for the SSIT product 306 are of the same type.

FIGS. 4-1 and 4-2 illustrate a second exemplary apparatus where the unique SSIT products have top dies comprising different types of FPGA slices. In FIG. 4-1, a first SSIT product 402 has two top dies, one top die 412a of type 406, and one top die 412b of type 408. A second SSIT product 404 has three top dies, one top die 414a of type 406, one top die 414b of type 408, and one top die 414c of type 406. In order for a single package substrate type to be compatible with both the SSIT product 402 and the SSIT product 404, the two products must have (i) compatible top dies, (ii) compatible interposer patterns, and (iii) compatible package footprints.

Here, the two top dies 412a, 412b of SSIT product 402 are of the same respective types as the first two top dies 414a, 414b of SSIT product 404, because both has a top die 412a/414a of type 406 and a top die 412b/414b of type 408. Therefore the SSIT products 402 and 404 have the same sequence of top die types and so the first condition is satisfied.

The SSIT products 402 and 404 also have compatible interposer patterns because their interposers have the same and repeatable μbump and C4 bump configurations in the area under the top dies. This is shown in the side view illustrated in FIG. 4-2.

The SSIT products 402 and 404 may be requested by the customer to use the same package footprint. If the package footprints are the same size, with the same number of balls in the BGA, and the number of I/O channels from the common top dies is the same, then they may be determined to be compatible. Because all three criteria are satisfied, a single type of package substrate 112 may be made to be compatible with both the SSIT product 402 and SSIT product 404.

Once it is determined that a single package substrate type can be compatible with multiple unique SSIT products, additional factors may be considered in utilizing the same package substrate type with multiple unique products.

First, the edge C4 bumps of the unique SSIT products may be made to match each other. In order to meet minimum density requirements, the area of the interposer that overhangs the top dies will typically contain dummy edge bumps. For example, as shown in FIG. 3-1, the SSIT product 304 may have dummy C4 bumps along its bottom outer edge 312a, top outer edge 312b, left outer edge 312c, and right outer edge 312d. The SSIT product 306 may also have dummy C4 bumps along its four outer edges. In order for the SSIT products 304 and 306 to be compatible with a single package substrate type, the dummy bump patterns on the edges 312b, 312c, and 312d on the SSIT product 304 may match the dummy bump patterns on the corresponding edges on the SSIT product 306. However, because the SSIT product 304 is smaller than the SSIT product 306, due to having two top dies instead of three, the edge bumps of the SSIT product 304 along the bottom edge 312a will not match up with the bottom edge dummy bumps of the SSIT product 306. Instead, the bumps along the edge 312a may match (e.g., may be of the same type as) the active bumps at the corresponding location 310 on the SSIT product 306. For example, if the bumps on the SSIT product 306 at the location 310 are power bumps, then the bumps along edge 312a on SSIT product 304 may be matching power bumps. As another example, if the bumps at the location 310 on the SSIT product 306 are ground bumps, then the bumps along the edge 312a of the SSIT product 304 may be matching ground bumps.

When a smaller SSIT product is placed on a package substrate that is also compatible with a larger SSIT product, some of the pads on the package substrate will be exposed due to the smaller number of C4 bumps on the smaller SSIT product. For example, as shown in FIG. 3-2, because the SSIT product 304 is smaller than the SSIT product 306, some of the pads 320 will be left exposed when the SSIT product 304 is used with the package substrate 112 that is also compatible with the SSIT product 306. Because these pads are not connected to any bumps, they will be inactive. However, care must still be taken that the exposed pads do not affect the package assembly process or negatively affect package reliability.

In addition, as can be seen in the side-view illustrated in FIG. 3-2, when a smaller SSIT product is attached to a package substrate compatible with a larger SSIT product, the smaller product will be off-center. Care should be taken to ensure that package reliability is not negatively affected by this. In some embodiments, the package substrate 112 contains a larger package lid contact zone on the substrate which allows for multiple package lid edge widths. This can be used to compensate for the differences in the interposer area and the offset of the package. FIG. 5-1 illustrates an exemplary apparatus wherein the package substrate 112 contains a normal sized package lid contact zone 502 on one side, and a larger package lid contact zone 504 on the other side. This allows for package lids with different edge widths to be used with the package substrate. For example, the package substrate can use a lid 506 with the small edge width on all sides, or a lid 508 with a larger edge width on one side to help compensate for the offset of the package due to the smaller interposer area of a compatible SSIT product, as illustrated in FIG. 5-2.

It should be noted that the terms "first" and "second" are used in this specification to refer to different items (e.g., different SSIT products), and they do not necessarily refer to an order of the items. Thus, the terms "first SSIT product" and "second SSIT product" may be used interchangeably. For example, item 306 may be considered a first SSIT product, and item 304 may be considered a second SSIT product.

Although particular examples have been shown and described, it will be understood that they are not intended to limit the claimed invention, and it will be clear to those skilled in the art that various changes and modifications may be made without departing from the scope of the claimed invention. The specification and drawings are, accordingly, to be regarded in an illustrative rather than restrictive sense. The claimed invention is intended to cover alternatives, modifications, and equivalents.

What is claimed is:

1. An apparatus, comprising:
a package substrate having a top surface and a bottom surface, the bottom surface configured to receive a ball grid array, the package substrate for a first stacked silicon interconnect technology (SSIT) product that comprises one or more top dies mounted on an interposer, the first SSIT product having a first top die configuration, wherein the package substrate includes a plurality of exposed pads disposed on the top surface and uncovered by the interposer, the plurality of exposed pads disposed in an arrangement suitable to receive at least one additional die, the exposed pads not soldered to another structure; wherein the package substrate is compatible with a second SSIT product with a second top die configuration; and wherein the first top die configuration is different from the second top die configuration; wherein the first SSIT product is smaller in size than the second SSIT product; and the first SSIT product has bumps along a side of the first SSIT product that are a same type as that of bumps at corresponding locations on the second SSIT product, the corresponding locations being away from a side of the second SSIT product.

2. The apparatus of claim 1, wherein the first top die configuration of the first SSIT product is compatible with the second top die configuration of the second SSIT product.

3. The apparatus of claim 1, wherein the first SSIT product has an interposer pattern that is compatible with an interposer pattern of the second SSIT product.

4. The apparatus of claim 1, further comprising the first SSIT product having a C4 bump pattern that is different from that of the second SSIT product.

5. The apparatus of claim 1, wherein the bumps along the side of the first SSIT product disposed between the interposer and the package substrate in an area of an edge the interposer uncovered by the one or more top dies comprise power bumps or ground bumps.

6. The apparatus of claim 1, wherein the first and second SSIT products use common package footprints.

7. The apparatus of claim 1, wherein the package substrate comprises a package lid contact zone, the package lid contact zone disposed on a first side of the package substrate that is larger than a package lid contact zone disposed on a second side of the package substrate.

8. The apparatus of claim 1, wherein the interposer is mounted off center relative to the package substrate.

9. The apparatus of claim 2, wherein the first top die configuration of the first SSIT products matches a subset of the second top die configuration of the second SSIT product.

10. The apparatus of claim 3, wherein the first top die of the first SSIT product has a μbump configuration that is a same as that of the second top die of the second SSIT product.

11. The apparatus of claim 3, wherein the interposer pattern of the first SSIT product has a same C4 bump configuration as that of the interposer pattern of the second SSIT product.

12. The apparatus of claim 3, wherein the interposer pattern of the first SSIT product has a C4 bump pattern that is a subset of a C4 bump pattern of the second SSIT.

13. The apparatus of claim 4, wherein: the first SSIT product comprises dummy bumps along four sides of the first SSIT product.

14. The apparatus of claim 6, wherein the first and second SSIT products have a same type of ball grid array (BGA).

15. The apparatus of claim 6, wherein the first and second SSIT products have compatible I/O and GT channel layouts.

16. An apparatus, comprising:
a package substrate having a top surface and a bottom surface, the bottom surface configured to receive a ball grid array; at least one die; and an interposer mounted off center on the top surface of the package substrate and electrically coupling the package substrate to the at least one die, wherein the package substrate includes a plurality of exposed pads uncovered by the interposer, the plurality of exposed pads not soldered to another structure, the plurality of exposed pads disposed in an arrangement suitable to electrically support an alternative interposer and support electrical function of the one die and at least one additional die both mounted on the alternative interposer, the exposed pads arranged to electrically support a ball grid array connection with the at least one additional die when mounted to the alternative interposer.

17. The apparatus of claim 16 further comprising:
a cover mounted to the package substrate, the cover enclosing the at least one die, interposer and exposed pads.

18. The apparatus of claim 16, wherein the package substrate comprises:
a package lid contact zone disposed on a first side of the package substrate that is larger than a package lid contact zone disposed on a second side of the package substrate.

19. The apparatus of claim 16 further comprising:
a C4 bump disposed between the interposer and the package substrate in an area of an edge the interposer uncovered by the at least one die, the C4 bump comprising a power bump or a ground bump.

20. The apparatus of claim 16, wherein the interposer mounted off center relative to the package substrate.

* * * * *